Aug. 28, 1928. 1,682,675
B. T. HORSFIELD
REFRACTORY HEAT INSULATING MATERIAL AND METHOD OF MAKING THE SAME
Filed Dec. 7, 1925
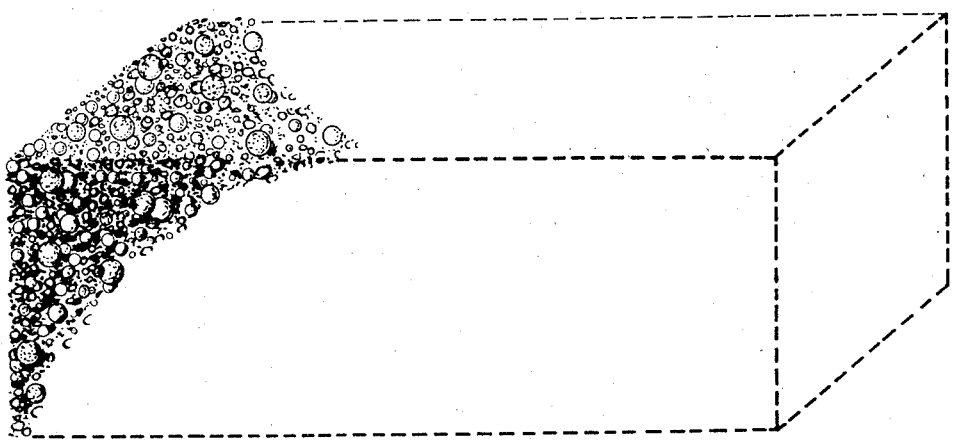
Inventor
Basil T. Horsfield
By his Attorneys
Cooper, Kerr & Dunham Patented Aug. 28, 1928.

1,682,675

UNITED STATES PATENT OFFICE.

BASIL T. HORSFIELD, OF BADIN, NORTH CAROLINA, ASSIGNOR TO ALUMINUM COMPANY OF AMERICA, OF PITTSBURGH, PENNSYLVANIA, A CORPORATION OF PENNSYLVANIA.

REFRACTORY HEAT-INSULATING MATERIAL AND METHOD OF MAKING THE SAME.

Application filed December 7, 1925. Serial No. 73,893.

This invention relates to the "refractory" art, and its chief object is to provide a body or article which not only possesses good thermal resistance but also has a high melting point and mechanical strength at elevated temperatures, in contrast to prior heat-insulating materials or articles, which, as is well known, suffer rapid loss of strength above certain temperatures and are destroyed or at least become incapable of carrying a working load at temperatures a little above red heat. Another object is to provide a refractory heat-insulating material or body which can be produced at reasonable cost and readily fashioned into practically any desired shape, as for example in situ to form the lining of a furnace or kiln or in blocks or the like for laying a lining or wall. A further object is to provide a refractory body which, possessing the advantages named above, shall also be light in weight.

The accompanying drawing shows, roughly, one embodiment of the invention.

The essential ingredient of this embodiment is a high melting oxide, preferably aluminum oxide, or a mixture of such oxides, in the form of relatively small particles each containing at least one "void". These particles, with or without the addition of other refractory material, are agglomerated or bonded together into a firmly coherent mass by means of a suitable binder, which may be, for example, sodium silicate, sodium aluminate, calcium aluminate, or bonding clay, with enough water to make the mass conveniently plastic. While the mass is still plastic it may be shaped to the desired form, as by tamping in a mold, after which it is dried and baked. Molding under pressure is often desirable, as giving a stronger article possessing greater compression strength than one which is merely tamped in the mold. One of the important factors to be considered in selecting a binder or bonding agent is its possible fluxing effect on the alumina or other oxide particles at the temperatures to which the material will be subjected in use, and a low-fluxing binder is therefore usually desirable, that is, a binder of such character or so regulated in amount, or both, that the blocks can safely withstand the temperature conditions of use.

A simple and practical method of converting an oxide, for instance natural alumina, or a mixture of oxides, as for example, lime, magnesia and alumina, into the form of small void-containing particles or bits is described at length in my copending application Serial No. 12,617, filed March 2, 1925. In the method there described the alumina is discharged from the furnace, in which it is fused, in the form of a relatively thin stream and is met by a transverse air or steam jet, by which it is blown into fragments. Upon examination these fragments are found to be hollow globules, ranging in size from very fine sand to one-eighth or three-sixteenths of an inch or more, in diameter, with walls which do not as a rule exceed one one-hundredth of an inch in thickness and are in most cases much thinner. In general the higher the velocity of the blast the finer the globules, and I have observed that if the velocity is too low any oxidizable substances in the alumina may not, in the case of the larger globules, be as completely oxidized as when a higher velocity is used, and may contain larger amounts of iron. Such larger granules are dark gray or black in color if containing much free carbon, and may be from one-fourth to one-half inch in diameter, and although hollow like the smaller ones they are apt to be quite irregular in shape. While I have successfully used air and steam at pressures ranging from fifty to one hundred and fifty pounds per square inch, the higher pressures are preferred as being less likely to produce insufficiently oxidized granules, especially when the stream of molten alumina is unduly viscous. I also prefer to have the temperature of the alumina well above the melting point, primarily to insure adequate fluidity of the stream. In making a carbon-free product from alumina containing excess carbon (added to reduce undesired oxides present in the natural ore) this superheating is desirable for the reason that it facilitates the oxidation of the carbon, both by the gas used for the blast (where, as is preferred, an oxidizing gas, as for example air or steam, is employed) and also by the air into which the alumina is blown.

It is well known that in blowing blast furnace slag there is produced a fibrous material commercially known as "slag wool", together with a large amount of small glassy pellets. This seems to be due to the property of silicate slags by virtue of which they pass through a pasty stage in cooling from the liquid to the solid state, so that as they are cooled in the air blast they are drawn out into the threads characteristic of slag wool. I believe this condition is characteristic of the silicates and not of pure high-melting oxides which are substantially free from silica, and as a matter of fact I have been able to produce like phenomena with molten aluminum oxide by adding about 5 per cent of silica. If, therefore, it is desired to avoid all production of threadlike forms the material to be treated should be low in silica and other substances which do not crystallize promptly when their temperature is reduced to or below the freezing point. Where it is necessary or desirable to remove silica from the oxide any convenient method for the purpose can be employed, as for example by treatment of the bauxite or other aluminous material with a carbonaceous reducing agent at a suitable temperature in the presence of iron, to reduce silica and cause the resulting silicon to alloy with the iron, as described in the patent of William Hoopes, Francis C. Frary and Junius E. Edwards, identified hereinafter.

For the purpose of my present invention I prefer, as a rule, small globules, none larger than will pass through a 20-mesh screen. With larger globules the molded blocks are lighter in weight and require rather less of the bonding material but on the other hand they have less resistance to crushing pressure; though in many cases the difference is too slight to be important, due to the fact that the walls of the globules, even when the latter are very large, say a quarter or five-sixteenths of an inch in diameter, are remarkably tough and strong in spite of their extreme thinness. In making the globules the factors governing the size thereof can be regulated to give approximately the desired size, and sieves or screens may then be used to separate those which are too large for the particular purpose in hand.

The amount of sodium silicate or other binder required to give adequate coherence to the material depends in general upon the strength desired and the permissible fluxing effect, and is therefore variable within wide limits. In any case the proportions suitable for a given use can readily be determined by trial.

For making blocks, bricks, or other shapes, the plastic mixture is tamped or pressed in suitable molds, dried, and baked. In drying the blocks a relatively low temperature is preferred, say not above 150° C. In baking a temperature of 1000° to 1050° C. has been found satisfactory, but much higher temperatures may be employed and are in general preferred. A brick made in this manner is illustrated in the accompanying drawing but the illustration is rather imperfect owing to the limitations of pen and ink as a medium for accurately picturing minute structures except at such large magnifications as are apt to be misleading. It will be understood, however, that the appearance to the eye is not important, the drawing being furnished merely to indicate in a general way that at least one of the major constitutents of the preferred material is in the form of small globules or pellets.

Globules of aluminum oxide are particularly suitable for my purpose. Bauxite or other crude alumina-bearing material can be purified for making such globules, as for example by the process described in my copending application above mentioned or in the United States patent of William Hoopes, Francis C. Frary and Junius E. Edwards, No. 1,534,316, issued April 21, 1925. As stated above, other oxides may be used, however, when their properties render them desirable.

The following specific examples of my invention are given as showing some of the results so far obtained.

A. Globular alumina, no globules larger than about 20-mesh size, 97.5 per cent; liquid sodium silicate 2.5 per cent, containing, approximately, sodium oxide 6.4 per cent and silica 24.7 per cent. Molded under pressure of 10,000 pounds per square inch and baked at 1400° C. After four hours baking the compression strength of the brick was 3585 pounds per square inch. With 5 per cent of the sodium silicate and correspondingly less globular alumina, with a baking temperature of 1400° C. as before, four hours baking gave a compression strength ranging from 4886 to 5030 pounds per square inch; eight hours, 4955; twelve hours, 5695; sixteen hours, 7285. With 10 per cent of the sodium silicate, four hours baking gave 6980 pounds per square inch.

B. Globular alumina, no globules larger than about 20-mesh size, 97.5 per cent; sodium aluminate 2.5 per cent, containing, approximately, sodium oxide 23.6 per cent and alumina 43.8 per cent. Molded under 10,000 pounds per square inch. Baked four hours at 1400° C. the compression strength was 2095 pounds per square inch. With 5 per cent and 10 per cent of the sodium aluminate, and correspondingly less of the alumina, four hours baking gave 3695 and 5665 respectively.

C. Globular alumina, no globules larger than about 20-mesh size, 97.5 per cent; bonding clay 2.5 per cent. Molded under 10,000 pounds per square inch. Baked four hours at 1400° C. Compression strength, 4735 pounds per square inch. With 5 per cent and 10 per cent of the clay, and correspondingly less of the alumina, four hours baking gave 4505 and 3405, respectively. Where high compression strength is not required the ratio of clay to alumina may be greatly increased, satisfactory results being obtained with 40 per cent clay and 60 per cent alumina.

D. With calcium aluminate as a binder, made by calcining equal parts of lime (CaO) and aluminum hydrate, unbaked bricks molded without pressure, and similar bricks baked four hours at 1400° C., were practically equal in compression strength for similar amounts of the binder, which in a number of experiments ranged from 12.6 per cent to 57.6 per cent. The compression strengths varied from 1345 pounds per square inch to 2386.

Replacing part of the globular alumina with solid particles gives a somewhat stronger but heavier article, but even with a substantial proportion of solid particles the article need not weigh, in general, more than about two-thirds as much as standard alundum, magnesite or chromite bodies of the same size. These solid particles may be produced by crushing or grinding hollow alumina globules, or by crushing or grinding ordinary alumina solidified from the molten state without blowing. In the examples given above a relatively small amount of broken globules was present. In general, if the brick is to be used chiefly for its heat-insulating properties, I prefer to use a maximum of unbroken globules or, in general, alumina containing a substantial proportion of voids; whereas if it is to be used largely for its refractory character I would give it a higher proportion of particles without voids. The latter particles may be alumina solidified from the molten state and crushed or ground to the desired size, or it may be crushed globules, or both.

I claim:

1. The method of making a refractory material, comprising melting a refractory oxide, changing the molten oxide into the form of strong hollow substantially spherical globules, and bonding the same with a refractory binder.

2. The method of making refractory material, comprising melting a refractory oxide and blowing the same into the form of strong hollow substantially spherical globules, and bonding such globules together with a low-fluxing binder into a coherent body.

3. The method of making refractory material, comprising treating fused naturally occurring alumina to remove non-aluminous oxides therefrom, blowing the treated alumina into the form of strong hollow substantially spherical globules, and bonding such globules together with a low-fluxing binder into a coherent body.

4. The method of making refractory material, comprising blowing into the form of hollow globules a stream of molten refractory oxide, and bonding such globules together with a low-fluxing binder into a coherent body.

5. The method of making refractory material, comprising blowing into the form of hollow globules a stream of molten alumina low in silica, and bonding such globules with sodium aluminate into a coherent body.

6. The method of making refractory material, comprising converting alumina into hollow globules, mixing with such globules a low-fluxing binder to form a more or less plastic mixture, and shaping and baking such mixture to form a coherent body.

7. The method of making refractory material, comprising converting fused alumina into strong hollow substantially spherical globules mixing therewith a binder and alumina particles substantially free from voids, and shaping and baking such mixture to form a coherent body.

8. The method of making refractory material, comprising converting molten alumina into hollow globules; mixing therewith like globules crushed or broken, and a binder to make a plastic mixture, and shaping and baking the mixture to form a coherent body.

9. The method of making refractory material, comprising shaping under high pressure a plastic mixture composed at least in part of hollow substantially spherical particles of alumina, and a binder, and baking at a high temperature the body so formed.

10. The method of making refractory material, comprising shaping under high pressure a mixture composed at least in part of hollow globules of alumina, and sodium aluminate, and baking at a high temperature the body so formed.

11. The method of making refractory material, comprising shaping under pressure of approximately ten thousand pounds per square inch a mixture containing hollow globules of alumina, and sodium aluminate, and baking the body so formed at a temperature of approximately 1400° C.

12. The method of making refractory material, comprising shaping a mixture composed at least in part of hollow substantially spherical particles of alumina, and a sodium compound as a bonding agent, and baking the body so formed.

13. A refractory body, composed largely of hollow substantially spherical particles of high-melting oxide, and binding material.

14. A refractory body, composed of alumina particles bonded with a sodium compound, a large proportion of the alumina particles being hollow and substantially spherical in form.

15. A refractory body containing strong substantially spherical hollow globules of high-melting oxide bonded with a low-fluxing binder.

16. A refractory body comprising strong substantially spherical hollow globules of high-melting oxide low in silica, bonded with a low-fluxing sodium compound.

17. A refractory body comprising hollow globules of alumina bonded together with a binder having insufficient fluxing effect to cause softening of the body at the temperatures to which such body is to be subjected in use.

18. A refractory body comprising hollow globules of low-silica alumina bonded together with sodium aluminate in amount insufficient to cause softening of the body at the temperature to which the same is to be subjected in use.

19. A refractory body composed essentially of bonded strong hollow substantially spherical globules of refractory oxide low in silica.

20. A refractory body composed at least in part of bonded hollow globules of alumina.

21. A refractory body composed at least in part of alumina and sodium aluminate, the former being at least chiefly in the form of hollow globules and the latter serving to bond such globules together.

22. A refractory body composed at least in part of void-containing particles of alumina, and a binder, said refractory body being capable of withstanding a temperature of 1500° C. and having a compression strength exceeding 2000 pounds per square inch.

23. A refractory body composed at least in part of void-containing particles of alumina, and sodium aluminate as a binder, said refractory body being capable of withstanding a temperature of 1500° C. and having a compression strength exceeding 3000 pounds per square inch.

24. A refractory body composed at least in part of hollow globules of alumina solidified from the molten state, and a binder, said refractory body being capable of withstanding a temperature of 1500° C. and having a compression strength exceeding 2000 pounds per square inch.

In testimony whereof I hereto affix my signature.

BASIL T. HORSFIELD.